United States Patent Office 2,977,327
Patented Mar. 28, 1961

2,977,327

PROCESS OF PRODUCING NICKEL CATALYSTS

Murray Raney, Lookout Mountain, Tenn., assignor to Raney Catalyst Company, Inc., Chattanooga, Tenn., a corporation of Tennessee No Drawing. Filed Sept. 26, 1958, Ser. No. 763,478

5 Claims. (Cl. 252—472)

My present invention relates to a process of preparing catalytic material, such as may be used in the hydrogenation of unsaturated organic compounds, and has particular reference to the preparation of nickel catalysts.

Since the work of Sabatier about 1895, there have been many descriptions in the patent and other literature covering methods for preparing nickel catalysts. Many of these methods are in commercial use at the present time. Some of the methods generally used employ as a starting material a nickel compound, such as nickel sulphate, nickel chloride, and nickel nitrate, or an alloy of nickel with an alkali soluble metal, such as aluminum. Such compounds as nickel sulphate and chloride are precipitated with an alkali, such as sodium hydroxide or sodium carbonate, to produce a nickel hydrate or oxide which, after thorough washing in water to remove soluble impurities, is partially or completely reduced in hydrogen gas to produce the active catalyst. The nickel nitrate is usually broken down by heat to form a nickel oxide which is also reduced with hydrogen to form the catalyst.

The use of alloys of nickel and alkali soluble metals in preparing catalysts is described in my patents, principally U.S. Patents Nos. 1,563,587; 1,628,190 and 1,915,473. Methods have also been proposed which involve the use of elemental or massive nickel by reducing it to a fine powder by grinding. One of these was described in U.S. Patent No. 1,419,986, issued in June 1922, to Richardson. From available references, there has never been any general application of the Richardson or similar methods.

There are commercial uses for nickel powder which has been prepared by grinding elemental or massive nickel to a fineness of 200 mesh or finer. There is a similar fine nickel powder produced from nickel carbonyl. These powders have become commercially available only fairly recently, are shipped in kegs or drums and do not have to be protected from exposure to air. Such powders do have some catalytic action in the hydrogenation of a vegetable oil, for example, as will be described later in this specification.

It is, of course, desirable to reduce the cost of preparing a catalyst while, at the same time, producing a catalyst which is fully effective, for example, in the hydrogenation of a vegetable oil. For practical plant operation, it has been found that rich nickel aluminum alloys are not satisfactory for making a catalyst. For example, an alloy containing 65% nickel and 35% aluminum, after being pulverized to the same fineness as a 50% nickel, 50% aluminum alloy, is very slowly acted upon by a sodium hydroxide solution. Thus, an alloy with as little as 35% aluminum is virtually insoluble in sodium hydroxide and it is not practical to obtain a higher yield of nickel catalyst by increasing the nickel content of a nickel aluminum alloy beyond a certain point.

An object of my invention is to provide a process of preparing active nickel catalyst by mechanically mixing nickel powder with another material which will generate hydrogen gas in a water solution.

Other objects and advantages of the invention will be apparent from the following description.

In preparing catalyst by the methods disclosed in my patents, a nickel aluminum powder is treated with a sodium hydroxide solution which dissolves the aluminum, producing sodium aluminate and hydrogen gas. The hydrogen at the moment of formation is in the nascent state and it is possible that the action of this active hydrogen on the nickel present in the alloy is responsible for the excellent nickel catalyst which is produced by the method. I have found that this active hydrogen can apparently act on additional finely divided nickel which is intimately mixed mechanically with the nickel aluminum powder at the time the powder is introduced into the sodium hydroxide solution.

In my laboratory, I check the value of a catalyst by hydrogenating a vegetable oil in a test tube heated in an oil bath at atmospheric pressure. In making this test I use a ⅞" by 8" test tube. I place one-half teaspoonfull of wet catalyst in the test tube and add 30 cc. of the vegetable oil which I wish to hydrogenate. A pointed glass tube through which hydrogen may be bubbled is inserted in the suspension and rests on the bottom of the test tube. This assembly is suspended in an oil bath which is heated by means of a hot plate, or otherwise. A very slow flow of hydrogen passes through the suspension in the test tube until all of the water in the wet catalyst has been evaporated, and the temperature of the oil bath has reached 400 degrees Fahrenheit. At this point, the hydrogen flow is increased to the maximum possible without blowing the contents out of the test tube. This flow of hydrogen is continued for exactly one hour and the temperature maintained as near 400 degrees Fahrenheit as possible. Usually, the range is 400 degrees plus or minus five degrees.

At the conclusion of the test, the catalyst is filtered from the hydrogenated oil, and the iodine value of the hydrogenated oil is determined. The difference in the iodine value of the oil at the start and at the conclusion of the test is a measure of the activity of the catalyst. A catalyst is considered standard if, when tested in this way, it will reduce the iodine value of an oil, for example, from 114 to 1 to 3½. I have found that, generally, the nickel powders which are available on the market will reduce the iodine value of the starting oil in this test from 114 to about 80.

That nickel carbonyl or massive nickel powder has some catalytic action in the hydrogenation of a vegetable oil is shown by the following example:

Ten grams of a nickel carbonyl powder, all of which was finer than 200 mesh, was treated in a 25% sodium hydroxide solution at approximately 212 degrees Fahrenheit for two hours. After this treatment, the nickel carbonyl powder was washed free from alkali and kept under water. A standard hydrogenating test, as previously described, was then run with this nickel. The vegetable oil used had an initial iodine value of 114. After the test, the oil was filtered free from nickel and had an iodine value of 85. This indicated that the nickel did possess a weak catalytic property after being exposed to the action of sodium hydroxide solution. The same result has been obtained using massive nickel powder in place of nickel carbonyl powder.

My present work has been done with the standard nickel aluminum powders which may be used in producing the catalysts described in my patents. I have used commercial nickel powders which may be readily obtained on the market. I have used the nickel aluminum powders and the commercial nickel powders in varying proportions. The following example describes a typical production, but the method is not limited to the materials described, nor to the proportions given. I have discovered that the weak catalytic action of massive nickel or nickel carbonyl powders may be enhanced and developed by treatment as follows:

Six grams of 42% nickel, 58% aluminum catalyst powder, all of which would pass a 150 mesh screen, was mechanically mixed in a porcelain mortar with ten grams of the elemental nickel powder for fifteen minutes. The calculated nickel content of the nickel aluminum powder was 2.52 grams, so that the added nickel was practically four times the nickel contained in the nickel aluminum alloy. The added nickel was not combined chemically with the aluminum, but was thoroughly mixed mechanically with the nickel aluminum powder. The six grams of 42% nickel, 58% aluminum powder had a calculated content of 3.48 grams of aluminum. Seven grams of 76% flake sodium hydroxide were used to make a 25% sodium hydroxide water solution. Potassium hydroxide or other caustic alkali solution may be used in place of sodium hydroxide and nickel carbonyl powder may be used in place of elemental nickel powder. Also, a nickel silicon alloy or an alloy of nickel with another alkali soluble metal may be used in place of the nickel aluminum alloy.

The mixture of nickel aluminum powder and nickel powder was introduced into the sodium hydroxide solution in a glass beaker, with occasional stirring, over a period of about five minutes and, after all the mixture had been added, the contents of the beaker were held at about 212 degrees Fahrenheit for two hours with the liquid held about constant by adding water, to make up for evaporation. The caustic alkali solution does not attack the nickel. The residue in the beaker was washed free from alkali and kept under water. A portion of this residue without being exposed to air was used in the standard hydrogenating test. The iodine value of the oil was reduced from 114 to 1.56. This is the performance of an excellent catalyst.

When this wet catalyst was splattered on a hot plate with a spatula the particles did not sparkle, that is, it was not pyrophoric. A sample of the wet catalyst was thrown on a filter paper and then air dried for forty-eight hours at room temperature. A portion of the air dried catalyst when used in the standard hydrogenating test showed no activity at all.

This example shows that an excellent hydrogenating catalyst may be prepared by the method used. I have produced standard quality catalysts by using the nickel powder in smaller and larger ratios than four to one of the nickel content of the nickel aluminum alloy. I believe it may be possible to activate up to ten times as much nickel powder as the nickel present in the nickel aluminum alloy powder used.

From this, it will be seen that my new invention introduces a novel feature by adding nickel powder to the nickel aluminum powder, instead of making a richer nickel aluminum alloy, which is not satisfactory. In the processes described in my prior patents using no powdered nickel but only alloys of nickel and alkali soluble metals, much more nascent hydrogen is produced than is made use of. By mechanically mixing the powdered nickel with, for example, a nickel aluminum alloy, the powdered nickel, as well as the nickel released from the alloy, is apparently activated by the nascent hydrogen released in the reaction of the caustic alkali with the alloy. Thus, the cost of the aluminum destroyed in the reaction with the nickel aluminum alloy is materially reduced to produce the same quantity of active catalyst as that created when using only the alloy. The cost of the labor, steam, power and water used is the same, whether all of the active catalyst is produced solely from the nickel aluminum powder or from a mixture of the nickel aluminum powder and added nickel powder.

I claim:

1. The process of preparing a catalytic material by mechanically mixing a finely divided catalytic metal selected from the group consisting of nickel powder and nickel carbonyl powder with a powdered alloy of a finely divided catalytic metal and an alkali soluble metal selected from the group consisting of nickel aluminum alloy and nickel silicon alloy in a ratio of catalytic metal up to 10 times the weight of the content of catalytic metal in the alloy and treating this mixture with a caustic alkali solution selected from the group consisting of sodium hydroxide and potassium hydroxide solutions.

2. The process of preparing a catalytic material by mechanically mixing nickel powder with a powder of nickel aluminum alloy in a ratio of nickel powder up to 10 times the weight of the content of nickel in the alloy and treating the mixture with a caustic alkali solution selected from the group consisting of sodium hydroxide and potassium hydroxide solutions.

3. The process of preparing a catalytic material by mechanically mixing nickel powder with a powder of nickel silicon alloy in a ratio of nickel powder up to 10 times the weight of the content of nickel in the alloy and treating the mixture with a caustic alkali solution selected from the group consisting of sodium hydroxide and potassium hydroxide solutions.

4. The process of preparing a catalytic material by mechanically mixing nickel carbonyl powder with a powder of nickel aluminum alloy in a ratio of nickel carbonyl powder up to 10 times the weight of the content of nickel in the alloy and treating the mixture with a caustic alkali solution selected from the group consisting of sodium hydroxide and potassium hydroxide solutions.

5. The process of preparing a catalytic material by mechanically mixing nickel carbonyl powder with a powder of nickel silicon alloy in a ratio of nickel carbonyl powder up to 10 times the weight of the content of nickel in the alloy and treating the mixture with a caustic alkali solution selected from the group consisting of sodium hydroxide and potassium hydroxide solutions.

References Cited in the file of this patent

UNITED STATES PATENTS

| | | |
|---|---|---|
| 1,628,190 | Raney | May 10, 1927 |
| 2,257,800 | Howk | Oct. 7, 1941 |